A. MANELIS.
HOT AND COLD WATER MIXER.
APPLICATION FILED JAN. 15, 1921.
1,408,375.
Patented Feb. 28, 1922.
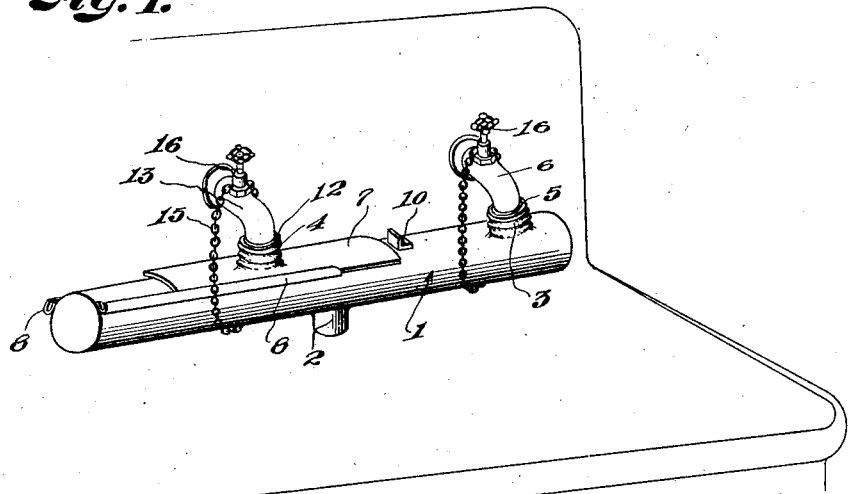
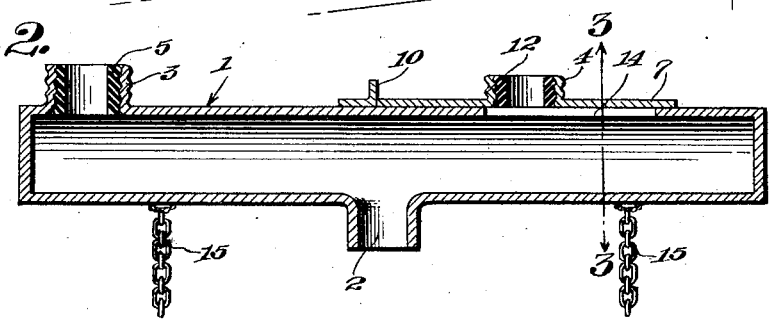
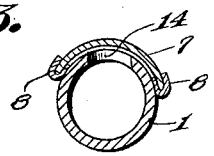
A. MANELIS.
INVENTOR
BY Victor J. Evans
ATTORNEY

UNITED STATES PATENT OFFICE.

ABRAHAM MANELIS, OF CHICAGO, ILLINOIS.

HOT AND COLD WATER MIXER.

1,408,375. Specification of Letters Patent. Patented Feb. 28, 1922.

Application filed January 15, 1921. Serial No. 437,465.

*To all whom it may concern:*

Be it known that I, ABRAHAM MANELIS, a subject of Russia, residing at Chicago, in the county of Cook and State of Illinois, have invented new and useful Improvements in Hot and Cold Water Mixers, of which the following is a specification.

This invention relates to a hot and cold water mixer adapted for use with any approved type of spigots such as are commonly employed in kitchen sinks, lavatories, etc.

An object of the invention is to provide a water mixer which may be quickly and easily attached to hot and cold water spigot, one which can be manufactured and marketed at a low cost, it being simple in construction.

A further object of this invention is to provide a hot and cold water mixer as specified in which one of the spigot receiving sleeves is adjustably supported by the body of the mixer to permit adjustment of the relative distance of the spigot receiving sleeves to permit the mixer to be attached to the hot and cold water spigots of plumbing appliances wherein the spigots are positioned at different distances.

Other objects of the invention will appear in the following detailed description and in the accompanying drawings wherein:

Fig. 1 is a perspective view of the improved hot and cold water mixer.

Fig. 2 is a longitudinal section through the mixer.

Fig. 3 is a cross section through the mixer taken on the line 3—3 of Fig. 2.

Fig. 4 is a detailed section of the mixer.

Referring more particularly to the drawing the improved water mixer comprises a cylindrical body 1 formed of tin or sheet metal and having its ends closed to prevent the escape of water therefrom. The cylindrical body 1 has an outlet branch 2 formed thereon or attached thereto, intermediate its ends and extending downwardly from the normal lower side of the body. Entrance of the hot and cold water into the body is had from points adjacent each end of the body through upstanding sleeves 3 and 4. The sleeve 3 may be struck from or attached to the body 1 in any suitable manner, and it is, preferably, spirally grooved or threaded to permit attachment thereto of a gasket 5 of soft rubber or analogous material to provide frictional engagement with the outlet end of a spigot or faucet 6. The sleeve 4 is attached to a plate 7 which is slidably mounted upon the body 1 and is guided in its slidable movement by substantially U shaped ribs 8 soldered or otherwise suitably attached to the body 1. Outward movement of the sliding plate 7 is limited by plugs 9 of solder or any suitable material mounted in the outer ends of the U shaped ribs 8 while inward movement of the plate is limited by a stop 10 formed of an angular piece of material soldered or otherwise attached to the body 1 and presenting an upstanding abutment to the adjacent end of the plate 7. The sleeve 4 has a gasket 12, of soft rubber or analogous material, therein to permit fluid tight frictional contact with a spigot or faucet as shown at 13 and it is spirally corrugated or grooved similar to the sleeve 3 to provide firm connection between the gasket 12 and sleeve 4. The body 1 is provided with longitudinally extending opening 4 with which the bore of the gasket 12 registers and which provides for the passage of water into the body 1 at different adjusted positions of the plate 7 and sleeve 4. It is understood, of course, that the plate 7 is adjustably supported by the body 1 to permit proper attachment of the sleeves 3 and 4 to spigots or faucets 6 and 13 and since these spigots or faucets are placed at different distances apart on different types of plumbing apparatus it is necessary to provide adjustment of one of the connecting sleeves 3 or 4.

Flexible members such as chains 15 are attached to the body 1 and are adapted to be passed over the faucet or spigots, preferably behind the valve operating rods 16 to prevent the force of the water, entering the body 1, from forcing the sleeves 3 and 4 off the spigots 13 and 6 respectively.

The force of the water entering the body 1 and passing longitudinally therethrough to the outlet branch 2 will, together with the forcing of the water through the outlet branch 2, thoroughly mix hot and cold water and the temperature of the water leaving the outlet branch 2 may be regulated by adjustment of the faucet valves in the usual manner.

It is, of course, to be understood that the invention may be constructed in various other manners and the parts associated in other relations and, therefore, I do not desire to be limited in any manner except as set forth in the claims hereunto appended.

Having thus described my invention what I claim is:

1. In a hot and cold water mixer, an elongated body provided with an outlet branch, an inlet sleeve rigidly connected to said body adjacent one end, said body provided with an elongated slot, a plate slidably carried by said body movable over said slot, and an inlet sleeve carried by said plate and registering with said slot.

2. In a hot and cold water mixer, an elongated body provided with an outlet branch, an inlet sleeve rigidly connected to said body adjacent one end, said body provided with an elongated slot, a plate slidably carried by said body movable over said slot, an inlet sleeve carried by said plate and registering with said slot, and flexible members connected to said body for engagement with plumbing fixtures.

3. In a hot and cold water mixer, an elongated body provided with an outlet branch, an inlet sleeve rigidly connected to said body adjacent one end, said body provided with an elongated slot, a plate slidably carried by said body movable over said slot, an inlet sleeve carried by said plate and registering with said slot, and resilient gaskets carried within said inlet sleeves for frictional engagement with plumbing fixtures.

4. In a hot and cold water mixer a cylindrical body provided with a branch outlet intermediate its ends, an inlet sleeve formed on said body adjacent one end, said body provided with an elongated opening, substantially U shaped ribs carried by said body, a plate slidably supported by said ribs and movable over said opening, a second inlet sleeve carried by said slidable plate and registering with said opening, said inlet sleeves spirally corrugated, and resilient gaskets mounted in said inlet sleeves.

In testimony whereof I affix my signature.

ABRAHAM MANELIS.